United States Patent [19]
Mizobuchi et al.

[11] Patent Number: 5,522,309
[45] Date of Patent: Jun. 4, 1996

[54] APPARATUS CAPABLE OF PRODUCING DIFFERENT KINDS OF FOODS

[75] Inventors: Hiroshi Mizobuchi; Mineo Jyuuri; Asahiro Nishikawa; Yoshiaki Ishino; Takeshi Nakai; Hiroaki Kobayashi, all of Higashiosaki, Japan

[73] Assignee: House Foods Corporation, Osaka, Japan

[21] Appl. No.: 481,388

[22] PCT Filed: Nov. 18, 1994

[86] PCT No.: PCT/JP94/01950

§ 371 Date: Jul. 17, 1995

§ 102(e) Date: Jul. 17, 1995

[87] PCT Pub. No.: WO95/13709

PCT Pub. Date: May 26, 1995

[30] Foreign Application Priority Data

| Nov. 18, 1993 | [JP] | Japan | 5-312614 |
| Nov. 18, 1993 | [JP] | Japan | 5-312615 |
| Nov. 18, 1993 | [JP] | Japan | 5-312616 |
| Nov. 18, 1993 | [JP] | Japan | 5-312617 |

[51] Int. Cl.⁶ .............. A23L 1/00; A47J 37/00; A47J 44/00
[52] U.S. Cl. ............ 99/334; 99/325; 99/348; 99/443 R; 99/468; 99/470; 99/472; 99/486; 364/400; 364/478
[58] Field of Search ........... 99/325–335, 348, 99/352–355, 443 R, 443 C, 468, 470, 472, 486, 485, 483, 484; 366/144–146, 314, 601; 364/400, 557, 550, 578, 477, 478, 479; 221/150 R, 150 A, 150 HC

[56] References Cited

U.S. PATENT DOCUMENTS

| 4,686,356 | 8/1987 | Ueda et al. | 364/477 |
| 4,752,455 | 5/1988 | Schreyer | 364/400 |
| 4,919,950 | 4/1990 | Mak | 99/348 |
| 4,944,218 | 7/1990 | Cresson | 99/334 |
| 4,979,435 | 12/1990 | Hayashi et al. | 99/470 |
| 5,050,578 | 9/1991 | Luebke et al. | 99/443 R |
| 5,172,328 | 12/1992 | Cahlander et al. | 364/478 |
| 5,179,265 | 1/1993 | Sheridan et al. | 99/443 C |
| 5,228,382 | 7/1993 | Hayashi et al. | 99/334 |
| 5,230,279 | 7/1993 | McFadden et al. | 99/334 |
| 5,365,835 | 11/1994 | Naramura | 99/325 |
| 5,410,949 | 5/1995 | Yung | 99/468 |
| 5,427,016 | 6/1995 | Dunckel | 99/470 |

FOREIGN PATENT DOCUMENTS

| 281568 | 11/1989 | Japan . |
| 33103 | 2/1992 | Japan . |

Primary Examiner—Timothy F. Simone
Attorney, Agent, or Firm—Oblon, Spivak, McClelland, Maier & Neustadt

[57] ABSTRACT

The present invention provides an apparatus capable of producing different kinds of foods, the apparatus comprising plural number of processing devices, each having a specific function for treating or holding food materials, and one or more carrier vessels for transporting the food materials from one processing device to another, the carrier vessels having multiple functions and at least one compartment for holding the food materials treated or held in the processing devices. The apparatus is capable of producing different kinds of food products by instructing the carrier vessels to transfer food materials from one device to another according to the process requirements of the desired end products. The carrier vessel has a memory device that holds the information of the locations of devices from and to which the carrier vessels are instructed to transfer food materials. The carrier vessel or a separate control device controls the correct sequence and/or the locations of the processing devices for the carrier vessel to transport the food materials in accordance with the instructions contained in the memory device.

19 Claims, 2 Drawing Sheets

APPARATUS CAPABLE OF PRODUCING DIFFERENT KINDS OF FOODS

TECHNICAL FIELD

The present invention relates to a new type of apparatus capable of producing different kinds of foods at a high efficiency of production, the apparatus comprising plural number of processing devices, each having a specific function for treating or holding food materials, and one or more carrier vessels for transporting the food materials from one processing device to another, the carrier vessels having multiple functions and at least one compartment for holding the food materials treated or held in the processing devices. The apparatus is capable of producing different kinds of food products by instructing the carrier vessels to transfer food materials from one device to another according to the process requirements of the desired end products. The carrier vessel has a memory device that holds the information of the locations of devices from and to which the carrier vessels are instructed to transfer food materials. The carrier vessel or a separate control device controls the correct sequence and/or the locations of the processing devices for the carrier vessel to transport the food materials in accordance with the instructions contained in the memory device.

TECHNICAL BACKGROUND

As an apparatus for producing different kinds of food products including liquid food products such as curry, stew, soup and sauce and paste food products such as paste mustard, paste Japanese horseradish, pizza sauce and paste garlic, a continuous production apparatus employing transport pipes in many of transfer processes has been used, in which food materials such as liquid, solid, powdery and paste materials are introduced into a compounding hopper by means of transfer pipes, the obtained compounding materials are further transferred from said compounding hopper to the next processing process such as a mixing and stirring processing process and a heat-treating process by means of transfer pipes, and the obtained processed products are transferred to the next process.

Namely, as a continuous apparatus for producing food products, those in which processing devices in processing processes from compounding of food materials to the final products are connected by means of transfer pipes and food materials, processed products and intermediate products thereof are transferred by means of said transfer pipes have been generally used.

In addition, an apparatus for processing food products has been developed in which a stainless steel vessel is filled with contents, said vessel is rolled to mix the contents, and then the obtained product is transferred to each process.

The above continuous production apparatus connected with transfer pipes is suitable for producing the same product industrially in a vast amount, namely, so-called mass production of one kind of product; on the other hand, however, it has the following problems.

That is, in a continuous production apparatus with processing devices in processing processes connected with transfer pipes, each processing device is connected with said transfer pipe and fixed, and hence it is difficult to change the connection of each production process freely. Therefore, in order to produce products with some of processing processes largely different simultaneously or successively, it is necessary to provide a special device suited for producing said products separately or to modify said continuous production apparatus for producing the above products.

Besides, in the continuous production apparatus connected with transfer pipes, it is necessary that all processes from the introduction of materials to the preparation treatment of the final product are performed in succession once production starts; hence, once the operation of said continuous production apparatus starts, it is impossible to cease the apparatus at an optional production process at an optional time; for example, in order to perform the cleaning of the apparatus needed in case of producing another kind of product successively or maintenance of a part of the apparatus, it is necessary to cease the apparatus over all processing processes temporarily, and as a result, in case of producing plural kinds of products, there occurs a problem of a remarkable decrease of production efficiency.

Moreover, in order to perform the cleaning of the apparatus after use in each production process and the repair of damaged parts in the production apparatus connected with transfer pipes, it is often necessary that the whole disassembling or assembling of the apparatus over all processing processes is performed simultaneously, and the work is complicated over an extremely broad range and needs much time, which has restricted the improvement of production efficiency.

Furthermore, in a conventional continuous production apparatus with processing devices in processing processes connected with transfer pipes to fix, materials remain in said transfer pipes after the cease of production inevitably, which causes a problem that a considerable loss of materials occurs.

On the other hand, an apparatus in which the above stainless steel vessel is filled with contents, said vessel is rolled to mix the contents, and then the obtained mixture is transferred to the next process is a pipeless type; however, it only performs preparation by rolling a preparation tank capable of being sealed and preparation is restricted to specific one such as vacuum pasteurization preparation, and hence it is difficult to utilize it as an apparatus for producing general food products broadly.

Recently in the field of the production of food products, the trend of high-quality products including the variety of kinds of products to be produced in a production line and a lot of varieties has been heightened, which makes it important to establish a production apparatus and a production system suited for the production of different kinds of products in small amounts differing from the conventional production apparatus and production system suited for the mass production of the same product; since the conventional large-scale continuous production apparatus with transfer pipes connected to fix suitable for the mass production of the same product involves various problems including the above, it becomes more difficult to use it as it is as a production apparatus or a production system with production in a small amount as a target. Accordingly, there has been a strong demand for developing a new type of production apparatus and production system capable of dissolving the above problems found in said conventional continuous production apparatus surely and being used for the production of different kinds of products in small amounts suitably in the field concerned.

DISCLOSURE OF THE INVENTION

Under these circumstances as the basis, the present inventors have engaged in assiduous studies with a view to dissolving the above problems found in the conventional continuous production apparatus connected with transfer pipes and developing a new type of production apparatus and production system suited for the production of different kinds of products in small amounts, and as a result have developed an utterly new type of multifunctional carrier vessel instead of conventional transfer pipes and have found that the desired object can be accomplished by establishing an utterly new production system with said vessel provided among production devices of each processing process movably, which has led to the accomplishment of the present invention.

It is an object of the present invention to provide an apparatus for producing food products capable of producing different kinds of products suited for producing different kinds of food products at a high production efficiency simultaneously or successively.

It is another object of the present invention to provide an apparatus for producing food products capable of establishing continuous production processes without using transfer pipes provided as inevitable ones in the conventional continuous apparatus for producing food products.

It is still another object of the present invention to provide an apparatus for producing food products capable of producing different kinds of products comprising plural processing devices for producing food products and multifunctional carrier vessels provided among said processing devices movably in combination in a continuous apparatus for producing food products.

It is still another object of the present invention to provide an apparatus for producing food products capable of producing different kinds of products comprising at least one compartment in a continuous apparatus of producing food products, in which multifunctional carrier vessels having a function of transporting processed products in each processing process in said compartment from one processing device of the starting place of transport to the next processing device of the destination of transport.

It is still another object of the present invention to provide an apparatus for producing food products capable of producing different kinds of products characterized in that a function performing a specific treatment upon the above processed products is provided on each of the above processing devices to establish a production system using said devices.

It is still another object of the present invention to provide an apparatus for producing food products capable of producing different kinds of products, which can change production processes freely according to a free combination of the above processing devices and carrier vessels.

The present invention with a view to accomplishing the above objects comprises the following technical means.

(1) An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the carrier vessel has a memory device that holds the information of the locations of devices from and to which the carrier vessels are instructed to transfer food materials, and the carrier vessel or a separate control device controls the correct sequence and/or the locations of the processing devices for the carrier vessel to transport the food materials in accordance with the instructions contained in the memory device.

(2) An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the compartment of the carrier vessel has at least one processing means and has a control means capable of controlling processing conditions of the processing means in said compartment.

(3) An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the carrier vessel has a memory device that holds the information regarding the contents of processed products in the above compartments and the information regarding specific treatments to be performed upon said processed products, the processing device has a reading device reading the information held in said memory device, a device determining processing conditions of said processing device according to the read information and a control device controlling the above processing device according to the determined processing conditions.

(4) An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the carrier vessel has a memory device that holds the information regarding the contents of processed products in the above compartments and the information regarding specific treatments performed in the past upon said processed products, the above processing device or the transport passage has a reading device reading the information held in the memory device, a device determining processing conditions of said processing device according to the read information and a control device controlling the above processing device according to the determined processing conditions.

(5) An apparatus capable of producing different kinds of products according to the above (1) to (3) or (4), wherein the processing devices are formed movably.

(6) An apparatus capable of producing different kinds of products according to the above (1) to (3) or (4), wherein the processing means in processing devices is of storing, measuring, filling, mixing and stirring, heating, cooling, pressurizing, vacuumizing, drying, adding water, ventilation, pasteurization, thawing, pulverization, squeezing, granulation, aging, separation or formation.

(7) An apparatus capable of producing different kinds of products according to the above (2), (3) or (4), wherein the processing conditions is of storing, measuring, filling, mixing and stirring, heating, cooling, pressurizing, vacuumizing, drying, adding water, ventilation, pasteurization, thawing, pulverization, squeezing, granulation, aging, separation or formation in processing devices or compartments.

(8) An apparatus capable of producing different kinds of products according to the above (1) to (3) or (4) which has a holding chamber for holding plural carrier vessels and/or a specific processing chamber for performing specific treatments on the way of the transport passage of the above carrier vessels.

EXPLANATION OF SYMBOLS

Figure 1:
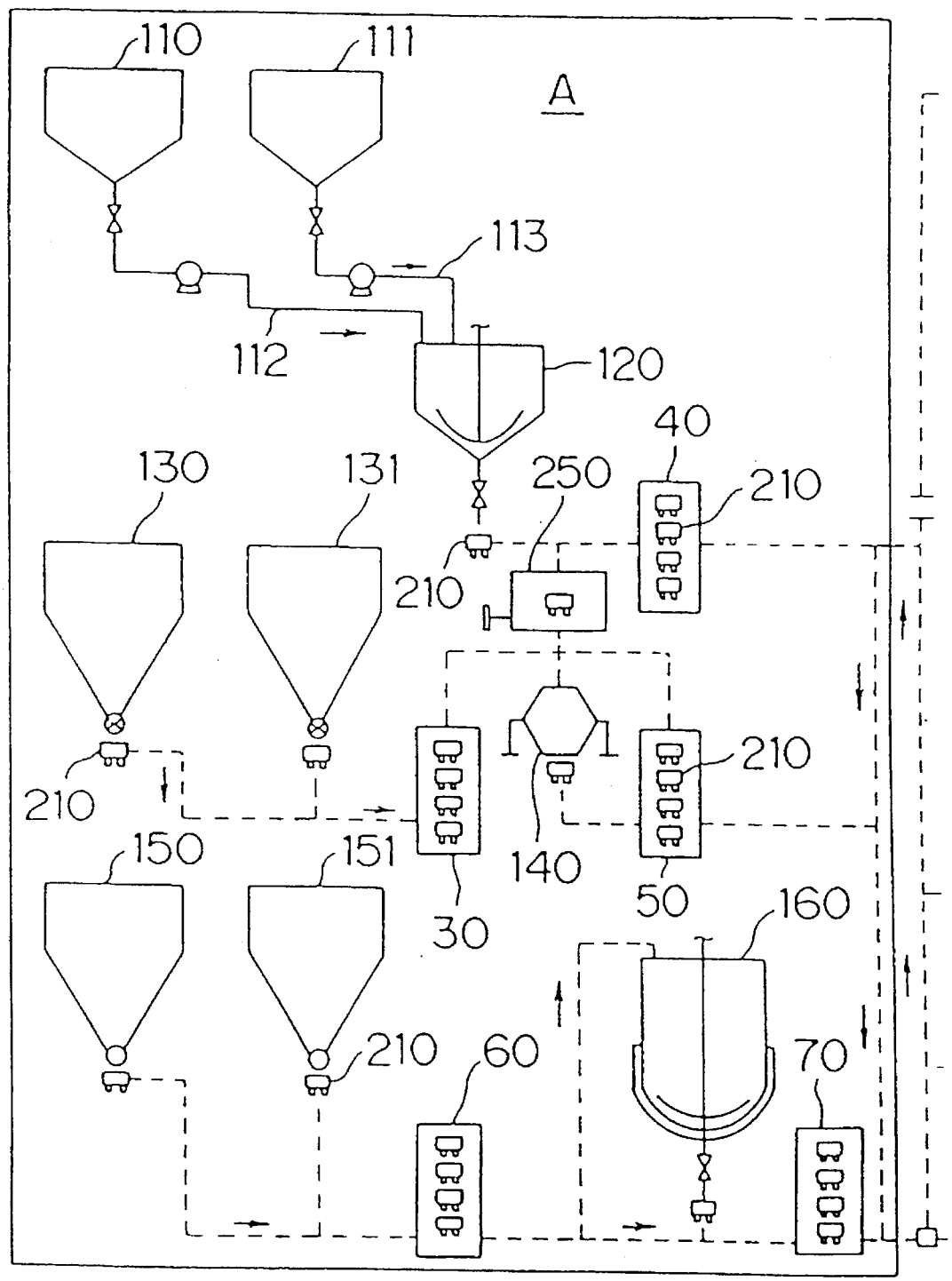
FIG. 1 shows the outline of an embodiment of a production apparatus according to the present invention and is an explanatory view showing the arrangement of processing devices in the process of pretreatments (first block A) and first carrier vessels.

30: Holding chamber
40: Holding chamber
50: Holding chamber
60: Holding chamber
70: Holding chamber
110: First processing device (for liquid materials)
111: First processing device (for liquid materials)
112: Transfer pipe
113: Transfer pipe
120: Second processing device (mixing and stirring/quantitative filling)
130: Third processing device (for powdery materials)
131: Third processing device (for powdery materials)
140: Fourth processing device (mixing and stirring)
150: Fifth processing device (for solid or paste materials)
151: Fifth processing device (for solid or paste materials)
160: Sixth processing device (heating/mixing and stirring/quantitative filling)
210: First carrier vessel
220: Second carrier vessel
250: Specific treatment chamber
300: Introduction device
310: Third carrier vessel
330: Stirrer
  (a): First stage (measuring/introduction)
  (b): Second stage (mixing/heating)
  (c): Third stage (transport)
  (d): Fourth stage (cyclic course)
  (e): Fifth stage (cleaning process)
  (f): Sixth stage (drying process)
  (g): Seventh stage (inspection/repair)

BEST EMBODIMENT FOR PERFORMING THE INVENTION

Hereunder, the present invention is described specifically according to the description of the drawings showing an embodiment of the present invention.

Figure 2:
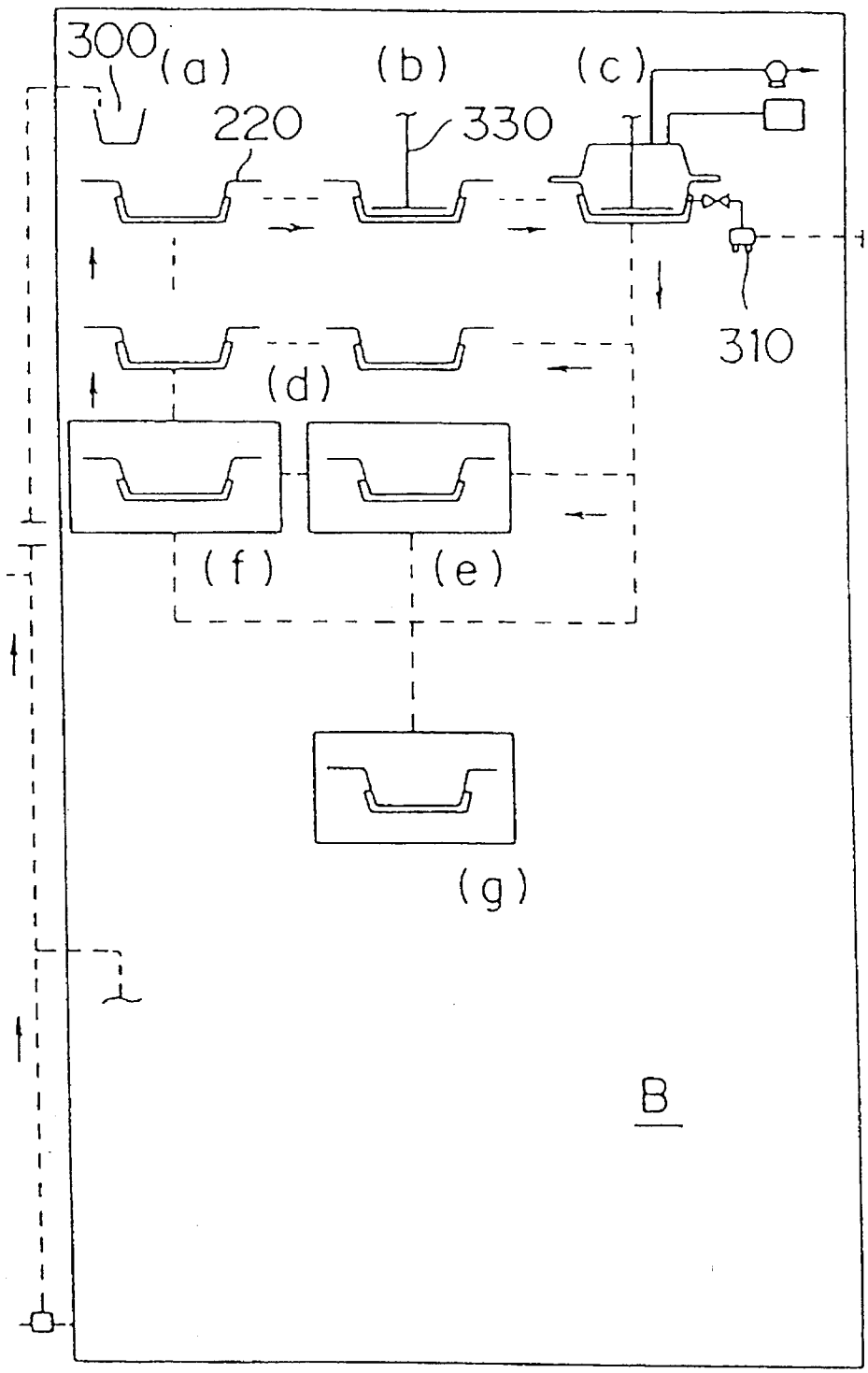
FIG. 2 shows the outline of an embodiment of a production apparatus according to the present invention and is an explanatory view showing the arrangement of processing devices in the process of main treatments (second block B), a second carrier vessel and third carrier vessels.

FIG. 1 and FIG. 2 show an embodiment of an apparatus for producing food products capable of producing different kinds of products according to the present invention. Said embodiment shows a typical example of a production line established by using an apparatus for producing food products capable of producing different kinds of products according to the present invention, and said production line is composed of, in the whole production process, as shown in FIG. 1 and FIG. 2, a first block A (FIG. 1) showing the arrangement of production devices in the process of pretreatments for performing pretreatments such as preparation of materials and a second block B (FIG. 2) showing the arrangement of production devices in the process of main treatments for performing main treatments.

First of all, the first block A is explained; production devices in the above first block A are composed of, as shown in FIG. 1, first processing devices 110 and 111 having a storing function, a second processing device 120 located next to said first processing devices and having mixing and stirring and quantitative filling (performing filling in a determined amount) functions, third processing devices 130 and 132 having storing and quantitative filling functions, a fourth processing device 140 located next to said third processing devices and having mixing and stirring functions, fifth processing devices 150 and 151 having storing and quantitative filling functions, and a sixth processing device 160 located next to said fifth processing devices and having heating, mixing and stirring and quantitative filling functions.

Of the above first to sixth processing devices, the first processing devices 110 and 111 and the second processing device 120 are processing devices for liquid materials, and said first processing devices 110 and 111 are liquid materials storing devices storing different kinds of liquid materials. Said first processing devices 110 and 111 are connected to the second processing device 120 with transfer pipes 112 and 113 so that liquid materials are supplied into the second processing device 120. Said second processing device 120 is equipped with a mixing and stirring device mixing and stirring supplied liquid materials and a quantitative filling device quantitatively filling said mixed and stirred liquid materials.

Next, the third processing devices 130 and 131 and the fourth processing device 140 are processing devices for solid or powdery materials, and said third processing devices 130 and 131 are solid or powdery materials storing devices storing different kinds of solid or powdery materials. And said third processing devices 130 and 131 are equipped with quantitative filling devices quantitatively filling stored solid or powdery materials. The fourth processing device 140 is equipped with a mixing and stirring device mixing and stirring solid or powdery materials supplied from said third processing devices 130 and 131.

Next, the fifth processing devices 150 and 151 and the sixth processing device 160 are devices for processing paste materials, and said fifth processing devices 150 and 151 are equipped with paste materials storing devices storing paste materials and quantitative filling devices quantitatively filling them. The sixth processing device 160 is equipped with a heating device heating paste materials supplied from said fifth processing devices and a mixing and stirring device mixing and stirring them.

The above first to sixth processing devices may be mounted to fix or the whole or some of them may be arranged movably; the processing devices formed movably are preferable since a lot of processing processes in a production line can be constructed more flexibly. The processing means in the above processing devices are not restricted to storing, measuring, filling, mixing and stirring and heating; other examples of processing means include a cooling, pressurizing, vacuumizing, drying, adding water, ventilation, pasteurization, thawing, pulverization, squeezing, granulation, aging, separation or formation; they are not restricted to the above but those having food processing functions may be employed properly.

Plural first carrier vessels 210 having multiple functions capable of moving freely among the processing devices in processing processes are arranged in the first block A so that the above liquid materials, solid or powdery materials and paste materials, and processed products and intermediate products thereof are transferred from one of the above processing devices to another, or from the first block A to the second block B.

The above first carrier vessel 210 has at least one compartment holding materials and processed products and intermediate products thereof and has a memory device that holds the information of the locations of devices from and to which the carrier vessels are instructed to transfer food materials. The carrier vessel or a separate control device automatically controls the correct sequence and/or the locations of the processing devices for the carrier vessel to transport the food materials in accordance with the instructions contained in the memory device.

The specific construction of the compartment of the above carrier vessel and the carrier machinery are not particularly restricted; preferable examples of the compartment include vessels capable of holding and discharging contents, vessels with lids capable of being opened and sealed freely, iron pots, capsule types and pressure-resistant sealed capsules, and preferable examples of the carrier machinery include independent transfer types such as an unmanned automatic carrier car; those with said compartment and carrier car formed in one piece, those with vessels capable of holding and discharging and unmanned carrier cars combined capable of being connected freely, and those with capsule-type vessels may be exemplified as preferable ones. In this case, carrier vessels may be formed so that the connection and separation of the compartment and the carrier machinery are performed automatically according to connection and separation mechanism.

In addition, the specific construction of the above transport establishing device is not particularly restricted, and it is composed of, for example, an ID system according to a memory card method or a control system with a built-in computer; as preferable examples of a memory device provided in a carrier vessel may be mentioned a data carrier, an ID plate and an ID tag, and as preferable examples of a control device may be mentioned a control system comprising a programmable controller and a central computer. As a reading device and a writing device needed in case of providing the above control device in another device may be exemplified a read-write head, an antenna and an ID controller preferably, and as communication means thereof may be exemplified a magnetic combination method, a microwave method and a light method preferably.

Moreover, a reading device reading the information held in the above memory device and a transport establishing device establishing the destination of transport of the first carrier vessel 210 according to the read information may be provided on the transport passage of the first carrier vessel 210 so that the destination of transport of the first carrier vessel 210 is controlled according to the established results. A case in which plural lines are arranged according to the kinds of desired end products is explained specifically; the above reading device is provided on the transport passage from the starting place to the destination (not shown), a proper line of the above is established according to the obtained compounding and the information regarding specific treatments performed on the above processed products such as processing conditions, and then it is held in the memory device regarding the destination of transport of the above first carrier vessel. The specific construction thereof is, for example, one according to an ID system according to a memory card method, and a preferable example thereof is a control system in which a data carrier, an ID plate and an ID tag are mounted on an unmanned car and a read-write head, an antenna, an ID controller and a programmable controller are provided on the transport passage.

The above first carrier vessel 210 may have, in addition to the above-mentioned basic functions, a memory device that holds the information regarding the contents of processed products in the above compartments and the information regarding specific treatments performed upon said processed products and the processing device may have a reading device reading the information held in said memory device, a processing conditions determining device determining processing conditions of said processing device according to the read information and a control device controlling the processing device according to the determined processing conditions.

The above first carrier vessel 210 may have a memory device that holds the information regarding the contents of processed products in the above compartments and the information regarding specific treatments performed in the past upon said processed products and the processing device or the transport passage may have a reading device reading the information held in the memory device, a processing conditions determining device determining processing conditions of said processing device according to the read information and a control device controlling the above processing device according to the determined processing conditions.

In case of performing transport from a processing device of the destination of transport to another processing device by means of the first carrier vessel 210, the memory device can also memorize the information regarding specific treatments performed in said processing device in addition to the read information. Besides, a writing device writing processing results performed by said processing device in the above memory device may be provided.

The specific construction thereof is not particularly restricted, and it is composed of, for example, an ID system according to a memory card method or a control system with a built-in computer; as preferable examples of a memory device provided in a carrier vessel may be mentioned a data carrier, an ID plate and an ID tag, and as preferable examples of a reading device and a writing device provided in each processing device may be mentioned a read-write head, an antenna and an ID controller preferably, and as communication means thereof may be mentioned a magnetic combination method, a microwave method and a light method preferably, and further as a data processing and controlling device may be mentioned a control system comprising a programmable controller provided in each processing device and a central computer preferably.

In this case, data communication in both directions of reading and writing may be performed by the above read-write head and data carrier, and various date including formalities of products, production numbers, processing data, processing conditions, judgment data and the destination of transport may be held in the memory region of the data carrier.

The above first carrier vessel 210 can determine the starting place and the destination of transport of materials and processed products and intermediate products thereof by means of the above transport establishing device optionally according to a specific program and combine each processing device with a carrier vessel properly, and it is possible to alter the process of production simply by freely combining each processing device with said first carrier vessel 210 according to the kinds of desired end products.

Moreover, the above first carrier vessel 210 may be provided with a memory device holding the information regarding processing operation performed in each processing device at the starting place or the destination of transport for transporting materials and processed products and intermediate products thereof held in the compartments in addition to the above functions. In case of performing transport from a processing device of the destination of transport to another processing device by means of the first carrier vessel 210, the memory device can also memorize the information regarding specific treatments performed in said processing device in addition to the read information. Besides, the processing device of the destination of transport may be provided with a reading device reading the information regarding processing operation held in the memory device of the above carrier vessel 210 and also with a control device controlling processing operation of the processing device of the destination of transport according to said information and a writing device writing processing results performed by said processing device in the above memory device. The specific construction thereof is not particularly restricted, and an ID system according to a memory card method and a control system with a built-in computer are mentioned as preferable examples.

In addition, the above first carrier vessel 210 may be provided with processing functions of processing devices in processing processes and a processing means capable of performing at least one independent processing process for materials and treatments thereof and also with a processing conditions controlling device capable of controlling processing conditions of said processing means in each compartment.

Examples of said processing means include mixing and stirring, heating, cooling, pressurizing, vacuumizing, drying, adding water, ventilation, pasteurization, thawing, pulverization, squeezing, granulation, aging, separation or formation. Thus the above first carrier vessel 210 becomes capable of substituting some of processing functions of the processing devices in the above processing processes, which reduces space required for the arrangement of an apparatus for producing food products sharply. Besides, since processing conditions of said processing means can be altered by the above processing conditions controlling device freely, it is possible, for example, to perform such treatments as heating and aging needing delicate control of conditions simply and surely in the transport process. The above processing functions are not restricted to the above and proper processing means may be provided.

Next, on the way of the transport passage of the first carrier vessel 210 are provided holding chambers 30, 40, 50, 60 and 70 holding plural first carrier vessels 210. In this case, it is possible to hold only the above compartments by separating them from the carrier machinery. The number of said holding chambers is not particularly restricted and a proper number of them may be provided. As the specific construction thereof, a shelf-type holding chamber equipped with devices of transfer, transport and elevation can be mentioned as a preferable example.

The materials and processed products and intermediate products thereof in the compartments of the first carrier vessels 210 held in holding chambers 30, 40, 50, 60 and 70 can be subjected to treatments needing a relatively long time such as storing, cooling, aging, standing by, keeping and adjustment of time as they are held in said holding chambers, and it is also possible to keep things with different compounding of materials and processing conditions in the compartment of each first carrier vessel 210, select necessary materials from the first carrier vessels 210 held in holding chambers 30, 40, 50, 60 and 70 according to the kinds of desired end products and transport them to the next processing device or a second block B. Then it becomes possible to arrange and hold first carrier vessels 210 in a number corresponding to the processed products and intermediate products with different compounding of materials and processing conditions, and it also becomes possible to perform compounding of materials, pretreatments and adjustment of time in production needing delicate control of conditions simply and surely by combining said first carrier vessels with holding chambers.

Moreover, on the way of the transport passage of the first carrier vessel 210 is provided a specific treatment chamber 250 having functions of preventing factors of influence upon production circumstances caused by performing treatments of materials and processed products and intermediate products thereof held in the compartment of the first carrier vessel 210, namely, unpleasant matters such as smell and diffusion of steam, performing treatments safely in a specific, separated region and maintaining production circumstances well. Thus it becomes possible to perform treatments accompanied with unpleasant matters and steam surely separately in the first block A, which makes it possible to perform treatments ensuring safety and good working circumstances. Specific examples of treatments performed in said specific treatment chamber 250 include heating, ventilation, pasteurization, thawing and pulverization; it is not particularly restricted to them and proper treatments may be performed.

Next, the second block B is described; as shown in FIG. 2, the second block B is a region for the main processing process performing so-called main treatments after the above process of pretreatments in the whole production process, and plural lines with plural processing stages equipped with processing devices having processing functions such as mixing and stirring, heating and quantitative filling provided thereon are provided. The above line is provided with plural second carrier vessels 220 so that they may move cyclically among the above plural processing stages.

Namely, in the second block B, one line is composed of a first stage (a) introducing processed products and intermediate products supplied by the first carrier vessel 220 from the above first block through the above process of pretreatments into the second carrier vessel 220, a second stage (b) performing main treatments such as mixing and stirring and heating in the compartment of the second carrier device 220, a third stage (c) discharging processed products and intermediate products subjected to said main treatments from the second carrier vessel 220, and a fourth stage corresponding to a stage circulating the second carrier vessel 220 having an empty compartment having discharged said processed products to the first stage a) again.

The above first stage (a) is provided with an introduction device 300 introducing processed products and intermediate products supplied from the above first block by means of the first carrier vessel 210 through the above process of pre-treatments into the second carrier vessel 220, and said introduction device 300 is provided with a quantitative device and a filling device. As a specific construction thereof may be mentioned a top-opened reversible-type introduction device preferably.

The second stage (b) is provided with a stirrer 330 performing mixing and stirring treatments of processed products in the compartment of the second carrier vessel 220 fixedly or movably upward and downward. As a specific construction thereof may be mentioned a mixing and stirring machine equipped with a pot up and down device, a heating and cooling device and a stirring blade preferably.

The third stage (c) is provided with a third carrier vessel 310 carrying processed products to the next final process of filling, a packaging device and a pasteurization device. As specific constructions thereof may be mentioned one with a compartment and a carrier car formed in one piece, one with a vessel capable of holding and discharging contents and an unmanned carrier car combined capable of being connected freely, and one with said vessel with a lid capable of being closed and opened preferably.

Moreover, in the second block B, the above line is provided with, in addition to the first stage (a) to the fourth stage (d), a line having a fifth stage (e) equipped with a cleaning device (not shown) cleaning the compartment of the second carrier vessel 220 needed in case of changing the kind of a desired end product and in case of finishing production and a sixth stage (f) equipped with a drying device (not shown) performing drying after cleaning. As specific constructions thereof may be mentioned a cleaning device equipped with a water-pouring device, a stirrer and a discharging device, and a drying device equipped with a warm air device preferably.

In this case, a change-over control method of each line is not particularly restricted and a proper method may be employed; in case that the weight of processed products and intermediate products to be introduced in the first stage (a) reaches a predetermined value (predetermined amount of production), an automatic change-over control device changing the destination of transport so that the second carrier vessel 220 is not sent from the third stage (c) to the fourth stage (d) but sent to the fifth stage (e) cleaning the compartment of the second carrier vessel 220 and the sixth stage (f) performing drying after cleaning may be used preferably. The specific construction thereof is not particularly restricted, but a control system comprising a production indication computer and a programmable controller may be mentioned as a preferable example.

Furthermore, in the second block B, the above line is provided with a line having a seventh stage (g) performing inspection and repair of the second carrier vessel 220 in case of emergencies additionally, and each stage is provided with an inspection device inspecting emergencies of said second carrier vessel 220 and an alarm device. The specific construction thereof is not particularly restricted, and an inspection device comprising a programmable controller, an infrared rays sensor, a distortion sensor and a distance sensor can be mentioned as a preferable example.

In order to inspect emergencies of the quantitative filling function of the second carrier vessel 220, each line is equipped with the following means preferably:

i) a measuring device measuring the weight of processed products introduced into the compartment of the second carrier vessel 220, ii) a measuring device measuring the weight of processed products discharged from the compartment of the second carrier vessel 220, iii) a calculating device judging whether or not the difference between the measured values obtained according to the above i) and those obtained according to the above ii) is within a predetermined range, and iv) an automatic change-over control device distributing the second carrier vessel 220 into the fourth stage (d) and the seventh stage (g) according to the results of the judgment of the above iii).

The inspection means of emergencies in the second carrier vessel 220 is not restricted to the above one based on measured values regarding quantitative filling, and one based on measured values regarding various processing functions of the second carrier vessel 220 including measured values of heating treatment temperature, pressure, torque and vibration may be employed.

Besides, in case that the above line is provided with a line provided with the seventh stage (g) performing inspection and repair of the second carrier vessel 220 with emergencies additionally, it is preferable that the fourth stage (d) may be provided with plural second carrier vessels 220 having empty compartments. In this case, it is preferable to provide a stage for allowing empty compartments to stand by at the middle of the line additionally. By it, it becomes possible that the fourth stage (d) as a circulatory passage has a preparatory second carrier vessel 220, and even if an emergency is inspected in the second carrier vessel 220 during production, production is not damaged and only the second carrier vessel 220 with an emergency can be sent to the seventh stage (g), and it is not necessary to cease the whole line for inspection and repair of carrier vessels during operation. Thus, by providing the above seventh stage (g), it becomes unnecessary to cease the line while one second carrier vessel 220 is sent to said seventh stage (g) for inspection and repair, and as a result, an extremely high production efficiency can be obtained. The above stages in the second block B are mentioned only as examples, and in the present invention, it is possible to construct a production process by properly combining stages equipped with proper processing means similarly to the above.

Next, the function of the apparatus for producing food products of the present invention is described according to the above production process constructed by using the apparatus for producing food products capable of producing different kinds of products of the present invention; in the first block A of FIG. 1, different kinds of liquid materials (liquid seasonings, liquid sugar, fruit juice, vegetable juice, solvents, fats and oils, extracts, spices, soup, sauce, milk, water, various compounding materials) in predetermined amounts stored in the first processing devices 110 and 111 are transferred to the second processing device 120 by means of transfer pipes 112 and 113 and mixed and stirred in said second processing device 120, and then predetermined amounts of liquid materials are introduced into the compartment of the first carrier vessel 210 through a quantitative filling device.

Similarly, different kinds of solid or powdery materials (wheat flour, starch, powdered sugar, solid or powdery seasonings, powdered milk, cheese powder, spices, bouillon powder, powdered fats and oils, vegetables, fruits, meat, various compounding materials) in predetermined amounts stored in the third processing devices 130 and 131 are introduced into the compartment of another first carrier vessel 210 quantitatively, and further, different kinds of paste materials (paste seasonings, meat extracts, vegetable extracts, vegetable extracts, roux, butter, margarine, shortening, various compounding materials) in predetermined amounts stored in the fifth processing devices 150 and 151 are introduced into the compartment of another first carrier vessel 210.

Said solid or powdery materials may be transferred to the fourth processing device 140 through the first carrier vessel 210 and mixed and stirred in said fourth processing device 140, and then introduced into the compartment of another first carrier vessel 210 quantitatively; and paste materials may be transferred to the sixth processing device 160 through the first carrier vessel 210 and mixed and stirred in said sixth processing device 160, and then introduced into the compartment of another first carrier vessel 210 quantitatively. Materials to be introduced in one compartment of the above first carrier vessel are not restricted to one kind, and it is possible to select plural kinds of the above materials properly to introduce.

The materials introduced into the compartment of the first carrier vessel 210 are subjected to at least one processing function of processing means provided in the first carrier vessel 210, namely, mixing and stirring, heating, cooling, pressurizing, vacuumizing, drying, adding water, ventilation, pasteurization, thawing, pulverization, squeezing, granulation, aging, separation and/or formation, and also subjected to treatments of heating, ventilation and pasteurization in the specific processing chamber 250 provided on the transport passage. The first carrier vessels 210 are held in holding chambers 30, 40, 50, 60 and 70 provided on the transport passage and materials and processed products and intermediate products thereof are subjected to treatments of storing and aging. Said holding chambers have a function of holding plural first carrier vessels 210 charged with materials with the same or different compounding of materials and processed products and intermediate products thereof to stand by, and they can allow them to stand by in a form corresponding the operation condition of the process of main treatments in the second block B.

The starting place and the destination of transport of the first carrier vessels 210 are established optionally by a transport establishing device provided in said first carrier vessels, and the transport control is controlled automatically according to a specific program by means of a memory device holding the information of locations of the starting place and the destination of transport provided in said first carrier vessels and a controlling device provided on said carrier vessels controlling the location of transport of said carrier vessels according to the information of locations held in said memory device or other devices.

In addition, the memory device of the above first carrier vessels 210 may hold specific specifications in advance at the initial stage if required, namely, information regarding the contents of processed products (numbers of products, kinds of products, numbers of materials, the due date of production, the due date of finishing compounding, finishing compounding batches, etc.); moreover, information regarding processing operation to be performed in each processing device, namely, information regarding specific treatments performed upon processed products (e.g., order of introduction in the post-process, storage conditions, numbers of processing machines, indication data of processing information) is held in the memory region of the above memory device, and a reading device of each processing device reads said information (indication data) at each processing stage and the processing operation is controlled at the controlling device of each processing device according to the read information.

Furthermore, the materials and processed products introduced into the compartments of the above first carrier vessels 210 are subjected to treatments such as measuring, filling, mixing and stirring, heating, cooling, pressurizing, vacuumizing, drying, adding water, ventilation, pasteurization, thawing, pulverization, squeezing, granulation, aging, separation or formation by processing means and processing conditions controlling means added onto said carrier vessels in the transfer process properly, if required.

The information regarding the results of treatments performed in the past upon materials and processed products introduced into the compartments of said first carrier vessels in the process of pretreatments (processing data such as numbers of introduced materials, values of results of introduced materials, values of total results of introduction, action elapsed time, judgement of the quality of products, values of results of processing conditions, weight and cleaning) is held in the memory device of said carrier vessel 210 if required, and the information held in said memory device is read by a reading device provided in each processing device, processing conditions are determined at the processing conditions establishing device of each processing device according to said read information, and further each processing device is controlled at the controlling device thereof.

After each treatment in the process of pretreatments, processed products of the compartments of the first carrier vessels 210 are introduced into the second carrier vessel 220 of the process of main treatments and subjected to main treatments. The above processed products are introduced into the introduction device 300 of the first stage (a) of the process of main treatments, and predetermined amounts thereof are introduced into the compartments of the second carrier vessels 220 by a quantitative device and a filling device of said introduction device in the same way as in the first carrier vessels 210, transferred to the second stage (b), subjected to a heating treatment with mixing and stirring in said second stage (b) and transferred to the third stage (c); at said third stage (c), processed products of the compartments of the second carrier vessels 220 are introduced into packaging vessels and pasteurized to obtain final products.

The empty second carrier vessels 220 having discharged processed products of the compartments are transferred to the fourth stage (d) and sent to the above first stage (a) again; in case of replacing with different kinds of processed products and in the case of finishing production at the first stage (a), the transport line of said second carrier vessels 220 is distributed so that the above second carrier vessels 220 are transferred from the above fourth stage (d) to the fifth stage (e), cleaned, transferred to the sixth stage (f), dried and sent to the above first stage (a) again. In addition, in case that emergencies of the above second carrier vessels 220 are inspected by an emergency inspection device provided on each stage, said second carrier vessels 220 are distributed to the line of the seventh stage (g), and inspection and repair are performed at said seventh stage (g).

The present invention has been described specifically according to FIG. 1 and FIG. 2; the present invention is not restricted to these embodiments and it is possible to simply construct a production system corresponding to the kinds of desired end products by altering the process of production properly according to a proper combination of processing devices, first carrier vessels and holding chambers in the above process of pretreatments and processing devices, stages, second carrier vessels and third carrier vessels in the above process of main treatments.

That is, in the first block A comprising plural processing devices and first carrier vessels in the process of pretreatments, all forms of materials including liquid, solid, powdery and paste materials can be used as materials singly or in combination, irrespective of kind; for example, various kinds of materials used for the production of liquid food products such as curry, stew, soup and sauce and paste food products such as paste mustard, paste Japanese horseradish, pizza sauce and paste garlic can be used properly. As a processing device, processing devices to be used mainly in the process of pretreatments performing treatments such as supplying, storing, mixing and stirring, quantitative filling, thawing, pulverization, squeezing, granulation, aging and separation and processing devices to be used mainly in the process of main treatments having functions such as heating, cooling, pressurizing, vacuumizing, drying, adding water, ventilation, pasteurization and formation can be properly combined to provide.

As carrier vessels, the following type is used, in which the first carrier vessels equipped with compartments holding materials and processed products and intermediate products thereof are provided among processing devices to establish the starting place and the destination of transport and allowed to move among said processing devices automatically according to a specific program to control so that said processed products are transferred to the next process, and if required, the above carrier vessels are provided with a memory device holding the information regarding the contents of processed products of the above compartments and the information regarding specific treatments performed upon said processed products, the above processing devices are provided with a reading device reading the information held in said memory device and processing conditions determining means determining processing conditions of said processing devices according to the read information and a control device controlling processing operation of the above processing devices according to the determined processing conditions, and further, said first carrier vessels are provided with, if required, at least one processing function of the above processing processes as additional functions.

Processing functions provided in the compartments of the above carrier vessels are not restricted to stirring and mixing, heating, cooling, pressurizing, vacuumizing, drying, adding water, ventilation, pasteurization, thawing, pulverization, squeezing, granulation, aging, separation or formation; for example, regarding heating processing means, an electrical heating means by a heater, a high-frequency heating means, a steam heating means, a gas heating means, a warm water heating means and a far-infrared heating means can be provided in proper forms. Regarding cooling processing means, cooling devices capable of being provided at a zone of proper temperatures, deep freezers capable of freezing and rapid freezing means with liquid nitrogen can be provided in proper forms. Regarding pressurizing and vacuumizing processing means, pressure-resistant sealing capsules and pressure-resistant sealing vessels can be used, which are formed into vessels capable of sealing compartments and in which pressurizing and vacuumizing conditions of proper levels can be established.

Thus, as the above processing means formed in the compartment of the multifunctional carrier vessel of the present invention may be used those provided with corresponding processing functions, irrespective of kind and form. In addition, plural carrier vessels provided with the same or different processing functions can be provided in proper combination at an optional place in each processing process.

Transport means of the first carrier vessels among processing devices are not particularly restricted, and transport passages and means in proper forms including a rail method, a vehicle method, a conveyor method, a lift method and a hanger method may be employed. Besides, holding chambers capable of holding plural first carrier vessels to stand by are provided properly among processing devices; the specific construction of said holding chamber is not particularly restricted and those of proper forms such as a shelf-type holding chamber equipped with transfer, transport and elevation devices may be used. Said holding chamber may be provided with various processing means such as storing, cooling and aging as additional functions.

Thus, it is important to construct a transport system in which the first carrier vessels are provided among processing devices and can move between the starting place of transport and the destination of transport freely, as described in the above first block A, and in which plural first carrier vessels in accordance with the compounding of materials, processing conditions, processing purposes and kinds of desired end products are arranged.

Specific means controlling processing conditions, mixing and stirring, quantitative filling, discharging and transfer of the above processing devices and transport and processing conditions of the first carrier vessels are not particularly restricted; as mentioned above, proper control systems such as those employing an ID system according to an ordinary memory card method and a control system with a built-in computer may be employed properly.

On the other hand, in the second block B, the construction of a production apparatus in the process of main treatments composed of the first (a) to the seventh (g) stages has been described in the above embodiment of the present invention; however, the construction of the production apparatus in the process of main treatments is not restricted to the above, but proper processing stages of other forms may be added or deleted; and the specific construction of each stage can be altered properly. In addition, though each line circulates to form a cycle in the above embodiment, the form of each line is not restricted to the above, and for example, it is possible to construct a line so that the second carrier vessels are provided among processing devices and move both ways to transport.

In the second block B, the second carrier vessels among stages may have processing functions performing at least one treatment of processing processes in addition to a transport function, similarly to the case of the above first carrier vessels. Similarly to the case of the first carrier vessels, as said processing functions may be exemplified measuring, filling, mixing and stirring, heating, cooling, pressurizing, vacuumizing, drying, adding water, ventilation, pasteurization, thawing, pulverization, squeezing, granulation, aging, separation or formation. Said processing means are not restricted to them, and proper one needed for main treatments may be employed.

Moreover, it is possible to construct a system of main treatments in the second block B meeting the production of different kinds of products by providing holding chambers capable of holding plural second carrier vessels at proper positions of each line of the second block B, and performing transfer and transport of proper kinds of second carrier vessels between the starting place of transport and the destination of transport according to the established program in the same way as in the above first carrier vessels.

As described above, in the above embodiment of the present invention, the first block A showing the construction of the production apparatus in the process of pretreatments and the second block B showing the construction of the production apparatus in the process of main treatments are divided and each block is provided with the first carrier vessels, the second carrier vessels and the third carrier vessels moving in the block; however, the arrangement of processing devices and carrier vessels is not restricted to the above, and for example, it is possible to provide a multifunctional carrier vessel common in processing devices in all blocks so that said carrier vessel may meet processing devices of pretreatments and processing devices of main treatments in common. In addition, it is also possible to employ a production system of the above second block in the process of pretreatments of the above first block A, in which each line circulates to form a cycle.

Thus, a multifunctional carrier vessel to be used in the present invention can be provided in each block including a part of the production process of different kinds of food products, as shown in the above embodiment or it can be provided in a form unitarily corresponding to all processes of the production of different kinds of food products; the combination thereof can be changed freely according to the scale of different kinds of products, kinds, the scale of production and production efficiency, which makes it possible to construct the most proper form easily.

Though processing devices for processing food products with a part thereof capable of moving have been known; however, a production apparatus like the present invention has never been proposed, in which plural first carrier vessels equipped with at least one processing function are provided among processing devices in each processing process, and a multifunctional carrier vessel moving freely among processing devices according to a program established in advance and equipped with transfer and transport functions instead of conventional transfer pipes and said carrier vessels are provided as main devices, and the present inventors have proposed one for the first time. The production apparatus of the present invention can be used as an apparatus for producing liquid food products such as curry, stew, soup and sauce and paste food products such as paste mustard, paste Japanese horseradish, pizza sauce and paste garlic suitably, but it goes without saying that it can be utilized broadly as an apparatus for producing general food products in addition to the above food products.

POSSIBILITIES OF INDUSTRIAL UTILIZATION

As described above in detail, the production apparatus of the present invention can transfer materials and processed products and intermediate products thereof without or hardly using transfer pipes, which have been considered indispensable for conventional continuous production lines of food products.

The production apparatus of the present invention can memorize the information upon specific treatments performed upon processed products of the compartments of carrier vessels if required, namely, the information regarding treatments such as measuring, filling, mixing and stirring, heating, cooling, pressurizing, vacuumizing, drying, adding water, ventilation, pasteurization, thawing, pulverization, squeezing, granulation, aging, separation or formation, and can also determine processing conditions of processing devices according to said information and control processing devices; hence it is possible to perform treatments of materials and processed products and intermediate products thereof surely according to a program and to perform the production of high-quality products needing strict processing control simply and surely. In addition, it is possible to perform treatments under delicate conditions by using a multifunctional carrier vessel with some of said processing means provided thereon and to reduce the whole production apparatus and space needed for providing it.

In case that an emergency or damage occurs in a part of the processing process, it has been conventionally necessary to cease the whole process to perform inspection or repair; however, in the production apparatus of the present invention, processing devices and carrier vessels can be provided independently in each processing process to check the influence due to emergencies or damage occurring at a part of the processing process to the minimum, which improves production efficiency remarkably.

Moreover, the arrangement meeting mass production has taken precedence in conventional production equipment, which has caused disadvantageous aspects and various problems for producing different kinds of food products efficiently; however, the production apparatus of the present invention can be provided with a proper number of carrier vessels in accordance with compounding of materials and kinds of products and a production system suited for producing different kinds of products in small amounts can be constructed simply.

What is claimed is:

1. An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the carrier vessel has a memory device that holds the information of the locations of devices from and to which the carrier vessels are instructed to transfer food materials, and the carrier vessel or a separate control device controls the correct sequence and/or the locations of the processing devices for the carrier vessel to transport the food materials in accordance with the instructions contained in the memory device.

2. An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the compartment of the carrier vessel has at least one processing means and has a control means capable of controlling processing conditions of the processing means in said compartment.

3. An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the carrier vessel has a memory device that holds the information regarding the contents of processed products in the above compartments and the information regarding specific treatments to be performed upon said processed products, the processing device has a reading device reading the information held in said memory device, a device determining processing conditions of said processing device according to the read information and a control device controlling the above processing device according to the determined processing conditions.

4. An apparatus capable of producing different kinds of foods which comprises plural number of processing devices, each having a specific function for treating or holding food materials, and one or more carrier vessels for transporting the food materials from one processing device to another, the carrier vessels having multiple functions and at least one compartment for holding the food materials treated or held in the processing devices, and the apparatus is capable of producing different kinds of food products by instructing the carrier vessels to transfer food materials from one device to another according to the process requirements of the desired end products, wherein the carrier vessel has a memory device that holds the information regarding the contents of processed products in the above compartments and the information regarding specific treatments performed in the past upon said processed products, the above processing device or the transport passage has a reading device reading the information held in the memory device, a device determining processing conditions of said processing device according to the read information and a control device controlling the above processing device according to the determined processing conditions.

5. An apparatus capable of producing different kinds of products according to claim 1, wherein the processing devices are formed movably.

6. An apparatus capable of producing different kinds of products according to claim 1, wherein the processing means in processing devices is of storing, measuring, filling, mixing and stirring, heating, cooling, pressurizing, vacuumizing, drying, adding water, ventilation, pasteurization, thawing, pulverization, squeezing, granulation, aging, separation or formation.

7. An apparatus capable of producing different kinds of products according to claim 2, wherein the processing conditions are of storing, measuring, filling, mixing and stirring, heating, cooling, pressurizing, vacuumizing, drying, adding water, ventilation, pasteurization, thawing, pulverization, squeezing, granulation, aging, separation or formation in processing devices or compartments.

8. An apparatus capable of producing different kinds of products according to claim 1, which has a holding chamber for holding plural carrier vessels and/or a specific processing chamber for performing specific treatments on the way of the transport passage of the above carrier vessels.

9. An apparatus capable of proucing different kinds of products according to claim 2, wherein the processing devices are formed movably.

10. An apparatus capable of proucing different kinds of products according to claim 3, wherein the processing devices are formed movably.

11. An apparatus capable of proucing different kinds of products according to claim 4, wherein the processing devices are formed movably.

12. An apparatus capable of producing different kinds of products according to claim 2, wherein the processing means in processing devices is of storing, measuring, filling, mixing and stirring, heating, cooling, pressurizing, vacuumizing, drying, adding water, ventilation, pasteurization, thawing, pulverization, squeezing, granulation, aging, separation or formation.

13. An apparatus capable of producing different kinds of products according to claim 3, wherein the processing means in processing devices is of storing, measuring, filling, mixing and stirring, heating, cooling, pressurizing, vacuumizing, drying, adding water, ventilation, pasteurization, thawing, pulverization, squeezing, granulation, aging, separation or formation.

14. An apparatus capable of producing different kinds of products according to claim 4, wherein the processing means in processing devices is of storing, measuring, filling, mixing and stirring, heating, cooling, pressurizing, vacuumizing, drying, adding water, ventilation, pasteurization, thawing, pulverization, squeezing, granulation, aging, separation or formation.

15. An apparatus capable of producing different kinds of products according to claim 3, wherein the processing conditions are of storing, measuring filling, mixing and stirring, heating, cooling, pressurizing, vacuumizing, drying, adding water, ventilation, pasteurization, thawing, pulverization, squeezing, granlulation, aging, separation or formation in processing devices or compartments.

16. An apparatus capable of producing different kinds of products according to claim 4, wherein the processing conditions are of storing, measuring filling, mixing and stirring, heating, cooling, pressurizing, vacuumizing, drying, adding water, ventilation, pasteurization, thawing, pulverization, squeezing, granlulation, aging, separation or formation in processing devices or compartments.

17. An apparatus capable of producing different kinds of products according to claim 2, which as a holding chamber for holding plural carrier vessels and/or a specific processing chamber for performing specific treatements on the way of the transport passage of the above carrier vessels.

18. An apparatus capable of producing different kinds of products according to claim 3, which as a holding chamber for holding plural carrier vessels and/or a specific processing chamber for performing specific treatements on the way of the transport passage of the above carrier vessels.

19. An apparatus capable of producing different kinds of products according to claim 4, which as a holding chamber for holding plural carrier vessels and/or a specific processing chamber for performing specific treatments on the way of the transport passage of the above carrier vessels.

* * * * *